Sept. 10, 1935.  I. GRILLI  2,014,325
BEVERAGE MAKING MACHINE
Filed Feb. 26, 1932  2 Sheets-Sheet 1
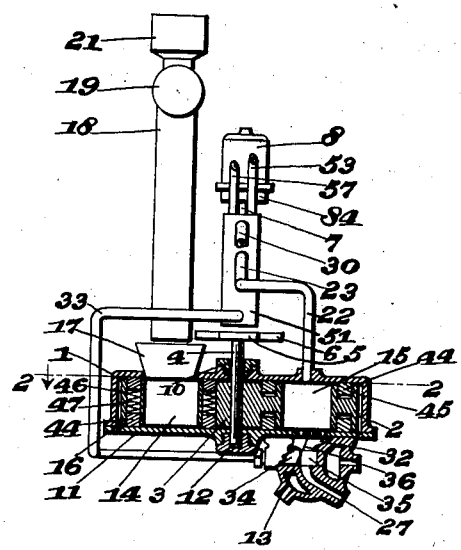
Inventor
Iginio Grilli
By Munn & Co
Attorney

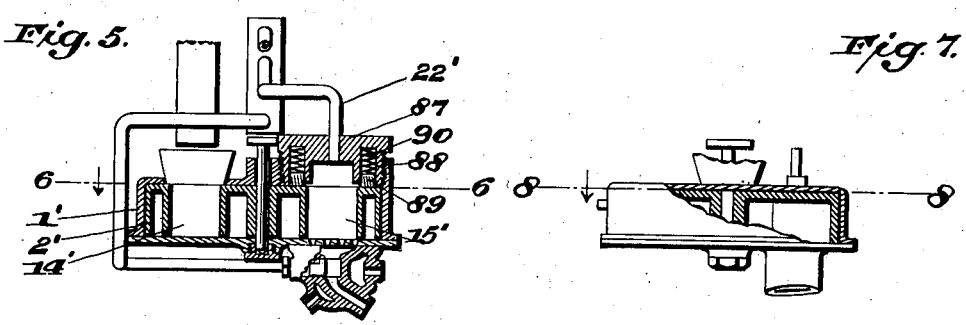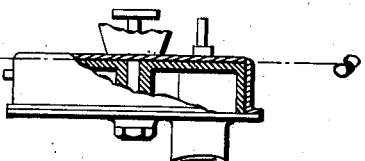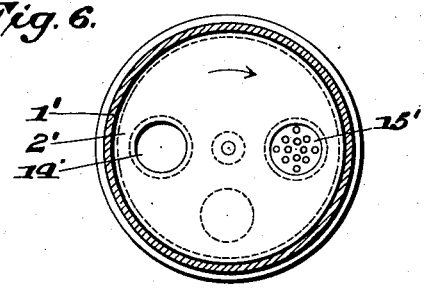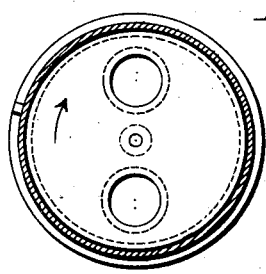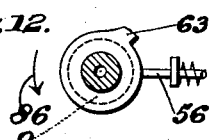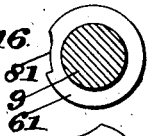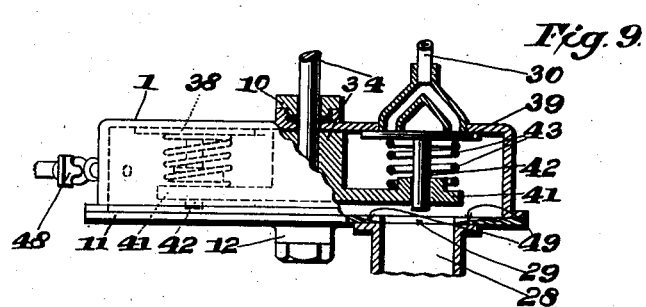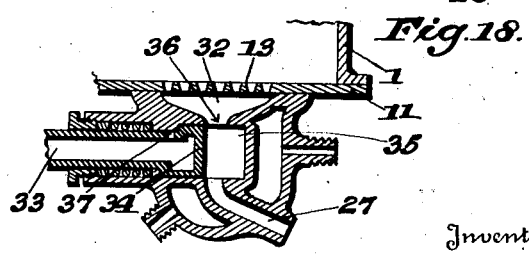

Patented Sept. 10, 1935

2,014,325

UNITED STATES PATENT OFFICE 2,014,325

BEVERAGE MAKING MACHINE

Iginio Grilli, Milan, Italy

Application February 26, 1932, Serial No. 595,397
In Italy March 12, 1931

10 Claims. (Cl. 53—3)

This invention relates to improvements in machines for making beverages, and its objects are as follows:—

First, to provide a beverage making machine, especially for making coffee, in which the operations of grinding and measuring out coffee, the delivery of the hot water and the final cleansing of all parts are performed automatically by a combination of electromechanical devices which are set in operation by a manual switch and kept in operation by an automatic switch for a selected period as hereinafter fully brought out.

Second, to provide a beverage making machine having facilities for the thorough and final cleansing operation of the apparatus after a period of use.

Third, to provide a bank of valves and a cam drum, certain cams of which periodically operate the valves so as to deliver water and steam to the apparatus in time for carrying out the various purposes of making the infusion, cleansing the filter and flushing out a particular infusion chamber, others of the cams of said drums controlling certain electrical devices from which power for the operation of the machine itself and for the operation of a certain coffee grinding motor is derived.

Other objects and advantages will appear in the following specification, reference being had to the accompanying drawings in which Figure 1 is a vertical section of the machine, parts being shown in elevation.

Figure 2 is a horizontal section taken substantially on the line 2—2 of Figure 1, particularly illustrating the 8-shaped rotary member.

Figure 3 is a partially sectional and elevational view taken at 90° from the vertical plane of Figure 1, a diagram of the electrical system being attached thereto.

Figure 4 is a plan view of the box or casing in which the foregoing rotary member is operable.

Figure 5 is a fractional sectional view similar to Figure 1, showing a modified form of the sealing rings.

Figure 6 is a horizontal section taken substantially on the line 6—6 of Figure 5.

Figure 7 is a fractional sectional view taken at 90° from the vertical plane of Figure 5.

Figure 8 is a horizontal section taken on the line 8—8 of Figure 7.

Figure 9 is a detail cross section taken on the line 9—9 of Figure 2.

Figure 10 is a side elevation of the bank of water and steam valves as well as of the cam drum, the housing of the valve bank being shown in section.

Figure 11 is a sectional view of one of the valves.

Figures 12 to 17 are a series of sections taken on the lines 12—12 to 17—17 of Figure 10, this series illustrating the shape of each cam as well as the position thereof when the rotary member is in the resting or infusion-making position in Figure 1.

Figure 18 is a sectional view of the filter cleaning valve and its associated structure.

In carrying out the invention provision is made of a box or casing, generally designated 1, which is circular in cross section (Fig. 2) and contains a rotary member 2. This member is of a substantial 8-shape (Fig. 2). It comprises a central hub 3 which is affixed to an upright shaft 4 in any suitable manner.

This shaft passes through the top of the casing, and its exposed end carries a so-called Maltese cross 5 which is one element of a gear train that is capable of imparting intermittent quarter-turns to the shaft 4, consequently to the member 2. The gear train is completed by a large gear 6 (Fig. 3) mounted on the shaft 7 of an electric motor 8. The shaft also carries a cam drum 9, the cams of which are described later.

Reverting to the upright shaft 4, the top of the box 1 is equipped with a packing gland 10 (Figs. 1 and 4) for the purpose of making a fluid-tight joint. The removable bottom 11 of the casing carries a step bearing 12 by which the lower end of the shaft 4 is supported. The bottom 11 is solid throughout with the exception of a perforated zone or filter 13 (Fig. 1) and a grounds discharge opening later described. This zone is of circular formation. The perforations may either be directly in the bottom 11, as shown, or the bottom may have a circular hole large enough to receive a screen.

In size the zone 13 will substantially match the chambers 14, 15 in the rounded extremities 16 which connect with the hub 3 and constitute the 8-shaped rotary member 2. It is into each of these chambers that the ground coffee is first discharged and then the hot water, the identical operation being repeated with respect to each chamber. The purpose of the two chambers is to speed the operation of the machine.

Consider the chamber 14 (Fig. 1). This is in a waiting position beneath a funnel 17 situated above the top of the casing 1 but having communication with the interior. A pipe 18 leads from a coffee mill 19 to the funnel 17, so as to discharge the ground coffee immediately into the funnel and from there into the chamber 14. The funnel hangs from the pipe 18 in a suspended position above the chamber 14 (or 15), and since the diameter of the pipe is less than the top diameter of the funnel, atmospheric air can enter the funnel. The funnel is smaller than and spaced from the opening in the top of the casing to permit the escape of vapor from the casing. The mill 19 is operable by an electric motor 20 (Fig. 3). The mill includes a hopper 21 from which the unground coffee is supplied.

Assume the chamber 15 (Fig. 1) to have been filled with ground coffee while said chamber was in the position of 14. The chamber 15 is now ready to be charged with hot water and steam, which elements are delivered by a pipe 22. This pipe enters the casing 1 through its top at a point opposite to the perforated zone 13. The pipe 22 has branches 23, 24 which connect with hot water and steam valves 25, 26 respectively. These valves are now opened alternately so as to discharge hot water and steam through the pipe 22 and into the chamber 15. The infusion thus prepared flows through a spout 27 (Fig. 1) into a waiting receptacle, as for example a cup.

Situated 90° from the perforated zone 13 in the clockwise direction is a refuse pipe 28 (Fig. 2), which has communication with the interior of the casing 1 through an opening 29 in the bottom 11. The pipe 28 is for the purpose of carrying off the grounds after the coffee making operation is completed. To carry out this purpose it is necessary that the rotary member 2 be given another quarter-turn, and this is accomplished by the gear train 5, 6. The member 2 having moved into the proper position, the grounds will drop into the pipe 28. The ejection of the grounds is augmented by a stream of hot water which is delivered by way of a scavenging pipe 30 (Figs. 3, 4 and 9). This pipe leads from a scavenging water valve 31 to an opening in the top of the casing over the opening 29. After the chamber 15 is washed out and the grounds have been washed down the refuse pipe 28, the chamber 15 will be in condition to receive a fresh charge of ground coffee when it returns to position beneath the funnel 17.

Consider the chamber 15 as still being over the opening 29 and the scavenging water as being discharged thereto. At the same time that this happens a jet of steam is delivered to the well 32 (Fig. 1) for the purpose of cleaning the perforated zone or filter 13. The steam projects against the under face of the filter, and in expanding in the interior of the casing 1 traverses the small holes and so does the cleaning.

Steam for this purpose is delivered to the well 32 by a pipe 33 (Fig. 18). The inner end of this pipe has a head 34. The head occupies a chamber 35 with the top of which the well 32 communicates through an orifice 36, and with the bottom of which the spout 27 has a free communication as shown.

Normally the head 34 stands at one side of the orifice 36 so that there is free passage for the coffee infusion through the chamber 35 to the spout 27. But upon the introduction of steam into the pipe 33, the latter makes a slight movement to the right (Fig. 18), driving the head 34 to the right end of the chamber 35, closing off the entrance to the spout 27 and discharging its jet through an opening 37 into the well 32 by way of the orifice 36. The steam pipe 33 will (in practice) include a flexible section to permit the necessary small amount of movement.

The chamber 15 is still regarded as being in registration with the opening 29. In order to close the openings of the funnel 17 and pipe 22, especially the opening of the funnel 17, the rotary member 2 is provided with circular or otherwise shaped plates 38, 39 (Fig. 2). These will underlie the foregoing openings in the top of the casing 1 and prevent the escape of steam particularly into the funnel 17. Should there be a small amount of residual steam in the casing 1 said steam will make its escape through the space below the bottom of the funnel 17 after the member 2 makes a further turn from the position now in contemplation, and thereby prevent moisture from reaching the funnel and pipe and so keeping each dry.

Arms 41 (Fig. 9) extending from the hub 3 at right angles to the extremities 16, carry the spindles 42 of the plates 38, 39. The spindles are loose in openings in the arms. A spring 43 situated between each arm and the respective plate keeps said plate forced up against the ceiling of the casing 1 so as to make an effective closure for the two openings.

In order to adequately seclude the chambers 14, 15 from the casing 1 the rounded extremities 16 are provided with packing rings 44. These are set in circular grooves 45 in the top and bottom of the extremities 16 in concentric relationship to the chambers 14, 15. The grooves are connected by a series of holes 46 (Fig. 2). These are occupied by springs 47 (Fig. 1) which press outwardly in opposite directions against the rings and so keep the rings in frictional contact with the ceiling and bottom of the casing 1.

At the end of a period of use of the machine a cock 48 (Fig. 4) at one side of the casing 1 is opened to admit water for the thorough flushing of the interior. The cock may be permanently connected with a source of water, either hot or cold, or it may be equipped with a nipple to which a hose is attachable.

The flushing of the casing 1 is accomplished by letting the water run in and at the same time set the rotary member 2 in operation. The packing rings 44, in rubbing against the ceiling and bottom of the casing, loosen any adhering matter. All this is flushed out at the opening 29. The bottom has canals concentric with the center one near the center as shown by broken lines in Figure 2, the other close to the margin of the casing, these canals being connected by channels 49 (Fig. 9) which communicate with the opening 29 and assist in directing the water thereto. The circular canals are important in that they aid largely in keeping the inside of the casing clean. The steam which passes through the filter 13 for its cleansing condenses on the inside of the casing and dampens the bottom 11. The moisture is gradually worked toward the canals and any stray particles of coffee are also worked toward the canals during turning of the rotary member where they are discharged. The accumulation of a deposit is thus avoided and clogging of the rotary member prevented. When operating the rotary member 2 in the foregoing manner the circuit of the motor 20 must be held open in any convenient manner so that the coffee mill 19 will not be permitted to operate.

Earlier reference has been made to supplying the pipe 33 (Fig. 18) with steam. The influx of steam is controlled by a valve 50 (Fig. 10). This valve, like its companions 31, 25 and 26 is contained by a housing 51 which is fixedly supported in any suitable manner in a position opposite to the cam drum 9. All of the valves are alike, and the description of the uppermost one 31 will suffice for all.

The valve 31 comprises a casing with a substantially central fluid chamber 52 (Fig. 11). This chamber has communication with a fluid pipe 53 which in this case is a hot water supply pipe. This same pipe extends down and supplies the valve 25 (Fig. 10). The valve member 54 (Fig. 11) is kept engaged with its seat by a spring 55, and when the stem 56 is depressed the valve member 54 disengages its seat and permits the flow of scavenging water to the pipe 30.

The same principle prevails in the valves 26, 50. These control the flow of steam to the pipes 22, 33 which is supplied by a steam supply pipe 57. The pipes 53, 57 extend to an appropriate boiler.

The depression of the valve stem 56 (Fig. 11) leads to a consideration as to how this and the similar stems of the remaining valves are operated. The cam drum 9, mentioned before, has a series of cams 58, 59, 60, 61, 62 and 63. The shapes of these cams are shown in Figures 12 to 17. Here said cams stand in the positions which they assume with respect to the various valve stems at the instant the rotary member 2 reaches the position in Figure 2 and stops in that position.

Considering the series of cams from top to bottom, cam 63 controls the stem 56 of the scavenging water valve 31; cam 60 controls the switch 64 (Fig. 3) of the coffee mill motor 20; cam 58 controls the stem of the hot water valve 25; cam 59 controls the stem of the steam valve 26; cam 61 controls the auxiliary main switch 65 (Fig. 3), and cam 62 controls the stem of the steam valve 50.

The switch 64 is embraced by an electrical circuit which comprises the feed wire 66, wires 67, 68, 69, 70 and 71, the latter connecting with the return feed wire 72. Closure of the switch 64 will energize the motor 20 as will readily be seen by tracing the foregoing wires.

In order to start the machine in operation it is necessary to close the main switch 73. A circuit embracing the motor 8 is then closed as follows:— Feed wire 66, wires 67, 74, 75, 76 and 77, the latter joining the return feed wire 72.

Shortly after the shaft 7 has started to turn the auxiliary main switch is automatically closed whereupon the following circuit is completed: Feed wire 66, wires 67, 78, 79, 76 and 77, the latter joining the return feed wire 72. The switch 65 includes a movable member 80 which is adapted to enter the recess 81 of the cam 61 (Fig. 16). When the member 80 is in the recess the switch 65 is open. The foregoing starting of the shaft turns the cam 61 and causes the right end of the member 80 to ride upon the periphery of the cam. This closes the switch 65 and keeps it closed for the duration of a revolution. The motor 8 is thus automatically kept in operation, and it is not necessary for the operator to manually keep the main switch 73 closed.

A signal 82 is connected in a shunt circuit 83 which derives current from part of the circuit involving the wires 78, 79. The signal 82 may comprise a lamp which remains lighted as long as the machine is in operation. When the latter has ceased the light goes out.

Attention is now directed to Figures 5 and 6. The chambers 14', 15' are now formed in a drum 2' of cylindrical configuration (Fig. 6), which is a rotary member as much so as is the 8-shaped member in Figure 1.

Hot water is introduced into the casing 1' through a hollow cap 87, the diameter of which is greater than that of the chambers 14', 15'. The cap has an annular groove 88 which contains a packing ring 89 supported by the springs 90. Said ring serves to seal the drum 2', especially around the two chambers 14', 15'. A pipe 22' leads from the cap 87 to valves which are the equivalents of 25 and 26 in Figure 10. The mechanism in Figure 5 is otherwise identical with that earlier disclosed, and the structures of Figures 1 and 3 are intended to read in connection with Figures 5 and 7 for a full understanding of the modification.

The operation is readily understood. The machine is started by closing the main switch 73 (Fig. 3). This is done by hand. The closure of the switch energizes the motor 8. This motor embodies a speed reducing set which is contained by a casing 84 (Fig. 3) below the motor housing. The R. P. M. of the motor is approximately 800, but the gear reducing set cuts the rate of rotation of the shaft 7 to one revolution per half minute. The cam drum 9 therefore rotates one revolution per half minute inasmuch as it is directly carried by the shaft 7. A complete cycle of functions occurs in the foregoing half minute.

The rotary member 2 (Fig 1) moves intermittently in the clockwise direction (arrow 85, Fig. 2). Its movements are measured in quarter-turns. The coffee chamber 15 is brought into position over the filter well 32 as the last of a prior step of operation. The movement occurred from a position 90° in the counter-clockwise direction (Fig. 2) as the result of the step motion of the gear train 5, 6 (Fig. 3). The chamber 15 was filled with ground coffee as part of the earlier operation. At this particular time the chamber 14 (Fig. 2) is empty.

Consider the series of cams on the drum 9 (Figs. 10 and 12 to 17). At this moment these are beginning a counterclockwise revolution (arrow 86, Fig. 12). The stems of the various valves 31, 25, 26 and 50 (Fig. 10) bear on the cams at the right as shown only in the instance of the stem 56 of the valve 31 in the cam series (Figs. 12, etc.).

The cam 61 (Fig. 16) will be the first to act. This immediately displaces the movable member 80 of the auxiliary main switch 65 (Fig. 3) closes that switch and keeps it closed for the duration of the revolution.

Next to act is the cam 60 (Fig. 3). This closes the switch 64 of the circuit in which the coffee mill motor 20 is located. The energization of the motor 20 causes the mill 19 to grind out a quantity of coffee which is delivered to the erstwhile empty chamber 14 by way of the pipe 18 and funnel 17 (Fig. 1). The extent of grinding, hence the amount of ground coffee delivered, is governed by the length of the cam 60.

The cam 58 (Fig. 14) acts approximately at the same time that the cam 60 acts. This will open the valve 25 (Fig. 10) for the discharge of hot water into the branch 23. This is conducted to the chamber 15 by way of the pipe 22. The cam 59 (Fig. 15) acts immediately thereafter. This opens valve 26 (Fig. 10) so that steam is discharged into the chamber 15 by way of the pipe 22 the instant after the discharge of hot water has ended.

It is to be observed in Figures 14 and 15 that there is a plurality of cam lobes 58, 59 and that these are variously spaced. The result of the arrangement is an alternate opening of the hot water and steam valves 25, 26 so that hot water and steam are injected into the chamber 15 in alternation. The infusion thus prepared passes through the perforated zone or filter 13 into the well 32 and so out of the spout 27 into the waiting receptacle.

The cams 58, 59 (Figs. 14 and 15) complete their duty in approximately a half revolution of the cam drum 9. The cams 62, 63 come into play approximately a quarter revolution of the cam drum 9 after the last lobe of the cam 59 (Fig. 15) has done its duty. In this quarter revolution the rotary member 2 makes a quarter turn so that the chamber 15 now containing only coffee grounds, comes over the opening 29 of the refuse pipe 28. The freshly filled chamber 14 then takes the position now occupied by the plate 38 (Fig. 2). The plates 38, 39 come into position beneath the pipe 22 and the funnel 17.

Now go back to the cams 62, 63. These open the steam valve 50 and hot water valve 31 (Fig. 10). The cam 62 holds the steam valve 50 open slightly longer than the cam 63 does its respective valve 31. The opening of the valve 31 delivers hot water by way of the pipe 30 to the chamber 15, flushing out the coffee grounds into the refuse pipe 28. The valve 50 delivers steam by way of the pipe 33 to the well 32, thereby cleansing the filter 13. The vapor entering the interior of the casing 1 is prevented from escaping at the funnel 17 into the pipe 18 by the plate 39 then in position as already described.

With respect to the admission of steam into the pipe 33, it has been explained that in practice this pipe will be arranged so that it will be subject to a slight movement when the pressure reaches the head to move toward the right in the chamber 35 and bring the opening 37 beneath the orifice 36. It is here that the steam discharges into the well 32 to cleanse the filter as described.

Another quarter turn of the rotary member 2 occurs between the completion of the functions of the cams 62, 63 and the return to its ultimate position of the recess 81 of the cam 61 (Fig. 16). This return permits the movable member 80 (Fig. 3) to drop into the recess and thus stop the machine, whereupon the signal 82 becomes dormant. But in the foregoing quarter turn of the member 2 the chamber 14 is brought into the position now occupied by the chamber 15 (Fig. 1) and vice versa. The chamber 15 contains fresh coffee in readiness for the making of the next infusion.

I claim:

1. A beverage making machine comprising a casing having a filter in its bottom flush with the plane of the bottom on the inside of the casing, a member in the casing having a chamber to register with the filter, means for then discharging water into the chamber, an exhaust spout for receiving the resulting beverage, a steam pressure-displaceable valve situated between the filter and spout normally in position to enable passage of the beverage to the spout, and means to introduce steam into the valve and move it for closing off passage and to discharge some of the steam against the underside of the filter.

2. A beverage making machine comprising a casing having a scavenging pipe entering its top and a discharge opening in its bottom, a rotary member situated in the casing having a chamber to receive coffee and being registrable with said pipe and opening, and inclined channels in the inner surface of the bottom of the casing, communicating with said opening.

3. A beverage making machine comprising a casing having an opening, a rotary member situated in the casing having at least one chamber which is registrable with the opening for the discharge of coffee grounds through the opening, means by which to introduce water into the casing for the flushing thereof while rotating said member, and channels in the inner surface of the bottom of the casing being in communication with the opening to carry off solid coffee particles.

4. In a beverage making machine, a casing having a filter from which coffee grounds are adapted to be washed after an infusion-making operation, a well beneath the filter through which the infusion is adapted to flow, and means to deliver steam into the well after the infusion has flowed off, to project against the under face of the filter and expand in the interior of the casing.

5. In a beverage making machine, a casing having a filter and a refuse pipe in spaced position, a rotary member in the casing having at least one infusion chamber to contain ground coffee and receive hot water, means to move the member so as to register the chamber first with the filter and then with the refuse pipe respectively to make the coffee infusion and to discharge the grounds, and means to discharge steam against the nether side of the filter after the making of the coffee infusion, said member and its chamber then being out of the way to let the steam traverse the filter holes and expand in the casing and so clean the filter.

6. In a beverage making machine, a casing having at least one charging opening, for example for the introduction of ground coffee, a rotary member within the casing having at least one infusion chamber periodically registrable with the opening to receive the coffee and then movable to another position whereat to make the infusion, a separate plate traveling with said member and fitting over the opening when the chamber is in the infusion-making position, and a spring to press the plate against the casing so as to seal the opening.

7. In a beverage making machine, a casing having at least one charging opening, for example for the introduction of ground coffee, a rotary member within the casing having at least one infusion chamber periodically registrable with the opening to receive the coffee and thereafter to assume a position of non-registration whereat an infusion is made, an arm carried by said member, a separate plate movably carried by the arm and covering the opening when said chamber is in the non-registering position, and a spring operating between the arm and plate to press the plate tightly against the casing to make a seal around the opening.

8. In a beverage making machine, a cam drum having cams, an electrical motor for rotating the cam drum, a casing, a rotary member in the casing, said member having at least one infusion chamber, means by which said member is also rotated by the motor, an electrical circuit embracing means for supplying the chamber with coffee and having a switch closable by one of the cams during rotation of the drum to produce a charge of coffee for the chamber, and a hot fluid supply having a valve operable by another one of the cams later in the rotation of the drum to charge the chamber with hot fluid.

9. In a beverage making machine, a rotary member having an infusion chamber, a casing containing said member and having at least one charging opening with which the chamber is registrable to receive ground coffee, means by which to introduce steam into the casing after an infusion-making operation, and a pipe to deliver ground coffee to the chamber at said opening, the end of the pipe being spaced from the casing at said opening to prevent the steam from entering the pipe.

10. In a beverage making machine, a casing having a bottom with a refuse opening, and a rotary member operable in the chamber over the bottom and having an infusion chamber to which ground coffee is deliverable, said bottom having annular canals respectively near the center of the casing and close to the margin, by which canal moisture and stray particles of coffee are receivable to prevent an accumulation on said bottom, said bottom also having channels connecting the canals with said refuse opening.

IGINIO GRILLI.